United States Patent
Slezak

(10) Patent No.: US 6,456,454 B1
(45) Date of Patent: Sep. 24, 2002

(54) HEAD DISC ASSEMBLY HAVING LOW INTERNAL AIR PRESSURE

(75) Inventor: Arnold George Slezak, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 114 days.

(21) Appl. No.: 09/590,312

(22) Filed: Jun. 8, 2000

Related U.S. Application Data

(60) Provisional application No. 60/158,841, filed on Oct. 12, 1999.

(51) Int. Cl.⁷ .............................................. G11B 17/02
(52) U.S. Cl. .................................................. 360/97.03
(58) Field of Search .......................... 360/97.02, 97.03, 360/97.04; 361/688, 690–692, 694

(56) References Cited

U.S. PATENT DOCUMENTS

| | | | | |
|---|---|---|---|---|
| 3,839,734 A | * | 10/1974 | George et al. ............... 360/102 |
| 4,062,049 A | * | 12/1977 | Dirks ....................... 360/78.12 |
| 4,092,687 A | | 5/1978 | Butsch .................... 360/97.02 |
| 4,194,225 A | * | 3/1980 | Hasler ..................... 360/97.02 |
| 4,216,512 A | | 8/1980 | Vidwans .................. 360/97.02 |
| 4,307,425 A | | 12/1981 | Kaneko et al. ............... 360/98 |
| 4,339,777 A | | 7/1982 | Gruczelak ................ 360/97.02 |
| 4,367,502 A | | 1/1983 | Iftikar et al. .................. 360/98 |
| 4,369,475 A | * | 1/1983 | Ho et al. .................. 360/97.02 |
| 4,377,830 A | | 3/1983 | Patel .......................... 360/98 |
| 4,471,395 A | * | 9/1984 | Beck et al. ............... 360/98.04 |
| 4,581,668 A | | 4/1986 | Campbell ................. 360/97.02 |
| 4,583,213 A | * | 4/1986 | Bracken et al. ............. 369/261 |
| 4,587,645 A | * | 5/1986 | Wong et al. ................ 369/75.1 |
| 4,633,349 A | * | 12/1986 | Beck et al. ............... 360/97.02 |
| 4,636,891 A | * | 1/1987 | Barski ..................... 360/97.02 |
| 4,680,656 A | * | 7/1987 | Manzke et al. ........... 360/97.03 |
| RE32,702 E | | 6/1988 | Hasler et al. ............. 360/97.02 |
| 4,857,087 A | * | 8/1989 | Bolton et al. ............... 55/385.6 |
| 5,023,733 A | * | 6/1991 | Koga et al. ............... 360/77.04 |
| 5,307,222 A | * | 4/1994 | Dion ....................... 360/97.02 |
| 5,335,217 A | | 8/1994 | Kaneda et al. ........... 360/97.04 |
| 5,886,850 A | * | 3/1999 | Kaczeus et al. .......... 360/97.01 |
| 5,923,496 A | * | 7/1999 | Perona ....................... 360/96.1 |
| 5,946,161 A | * | 8/1999 | Schuh ..................... 360/97.03 |

FOREIGN PATENT DOCUMENTS

| | | | |
|---|---|---|---|
| JP | 56-159877 | * | 12/1981 |
| JP | 3-280292 | * | 12/1991 |

* cited by examiner

Primary Examiner—Brian E. Miller
(74) Attorney, Agent, or Firm—John R. Wahl; Merchant & Gould P.C.

(57) ABSTRACT

A disc drive is disclosed which has a means for drawing a vacuum within the head disc assembly to reduce windage drag and reduce drive motor power consumption. The drive preferably has an internal air pump which includes an impeller disc fastened to the drive motor spindle within the head disc assembly and a stationary seal plate over the impeller disc which is fastened to the base plate and which prevents short cycling of the air. The base plate has a passage therethrough that communicates with an area adjacent a peripheral portion of the impeller disc. The impeller draws air from within the head disc assembly to the area adjacent the peripheral portion of the impeller disc and through the passage out of the head disc assembly to maintain a vacuum around the data storage disc within the head disc assembly during drive operation.

18 Claims, 3 Drawing Sheets

HEAD DISC ASSEMBLY HAVING LOW INTERNAL AIR PRESSURE

RELATED APPLICATIONS

This application claims the benefit of U.S. Provisional Application Serial No. 60/158,841, filed Oct. 12, 1999 entitled REDUCTION OF HEAD DISC ASSEMBLY (HDA) AIR PRESSURE WITH SPINDLE IMPELLER.

FIELD OF THE INVENTION

This invention relates generally to digital data storage devices and more particularly to a disc drive having a reduced internal air pressure within the head disc assembly during drive operation.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is written to and read from the magnetizable medium on the discs in a plurality of concentric circular tracks typically by an array of transducers mounted on the trailing end of "heads" and carried by a radial actuator assembly for movement of the heads relative to the discs. The read/write transducer, e.g. a magnetoresistive read and inductive write head, is typically used to transfer data between a desired track and an external environment. During a write operation, data is written onto the disc track and during a read operation the head senses the data previously written on the disc track and transfers the information to the external environment.

There is a continual need for higher data capacity in a disc drive in a given form factor, without increasing power consumption or the speed with which data can be transferred to and from the drive. Consequently, disc drive designs particularly focus on ways to achieve higher storage capacity and/or reductions in access times and processing times within the drive. One of the ways to help reduce access and processing time is to increase the spin speed of the drive motor. Today, disc drive speeds 10,000 to 15,000 rpm may be utilized in the drive. As the high end disc drive systems evolve, speeds of up to 25,000 rpm may be utilized. However, when the spin speed is increased, the power consumption of the drive motor increases. This, in turn causes the operating temperatures of the motors to increase, which can be detrimental to operation. This power consumption is partly due to increased windage friction generated by the air/disc interfaces within the drive. More importantly, as the speed increases, the windage induced vibration of the discs increases. Reducing the air pressure reduces the windage induced vibration. Accordingly, there is a need for disc drive data storage device that can efficiently and effectively operate at the higher spin speeds while consuming the same or even less power than in current production disc drives and minimizing the windage induced vibrations.

SUMMARY OF THE INVENTION

Against this backdrop the present invention has been developed. The present invention is a disc drive that generates a vacuum within the head disc assembly (HDA) during drive operation. Drawing a vacuum within the HDA permits the disc stack to be rotated at a given speed or angular velocity with lowered windage resistance and thus lower motor power consumption, and helps to lift the heads from the disc surfaces quicker, resulting in less head wear. The reduced air pressure of a vacuum within the HDA will reduce the frictional losses due to drag on the rotating discs permitting the drive to be operated at higher spin speeds without exceeding thermal limitations of the other components of the drive. A preferred embodiment of the present invention is a disc drive incorporating a fan assembly into the disc stack to pump the atmosphere within the drive to the drive exterior and thereby generate a vacuum within the head disc assembly (HDA). The fan assembly includes an impeller disc fastened to the spindle of the disc spin motor, a seal plate extending over the impeller disc and fastened to the base plate of the disc drive, and a discharge passage within the base plate extending through the base plate from a space adjacent a periphery of the impeller disc. A filter covers the discharge passage so that when the drive is de-energized, air returning into the HDA is filtered to prevent intrusion of contaminants.

When the disc drive is de-energized, the internal atmosphere of the HDA returns to equal pressure to the external environment. When the drive is started, the vacuum does not form until the drive is substantially up to speed. Consequently there is a substantial air force against the underside surfaces of the heads, causing them to lift from the landing zone quickly, well in advance of the drive achieving operating speed. This helps to minimize head wear. As drive speed increases, a vacuum is drawn within the HDA such that the heads correctly reposition themselves at a proper flying height above the disc surface for the desired operating speed.

These and various other features as well as advantages which characterize the present invention will be apparent from a reading of the following detailed description and a review of the associated drawings.

DETAILED DESCRIPTION

Figure 1:
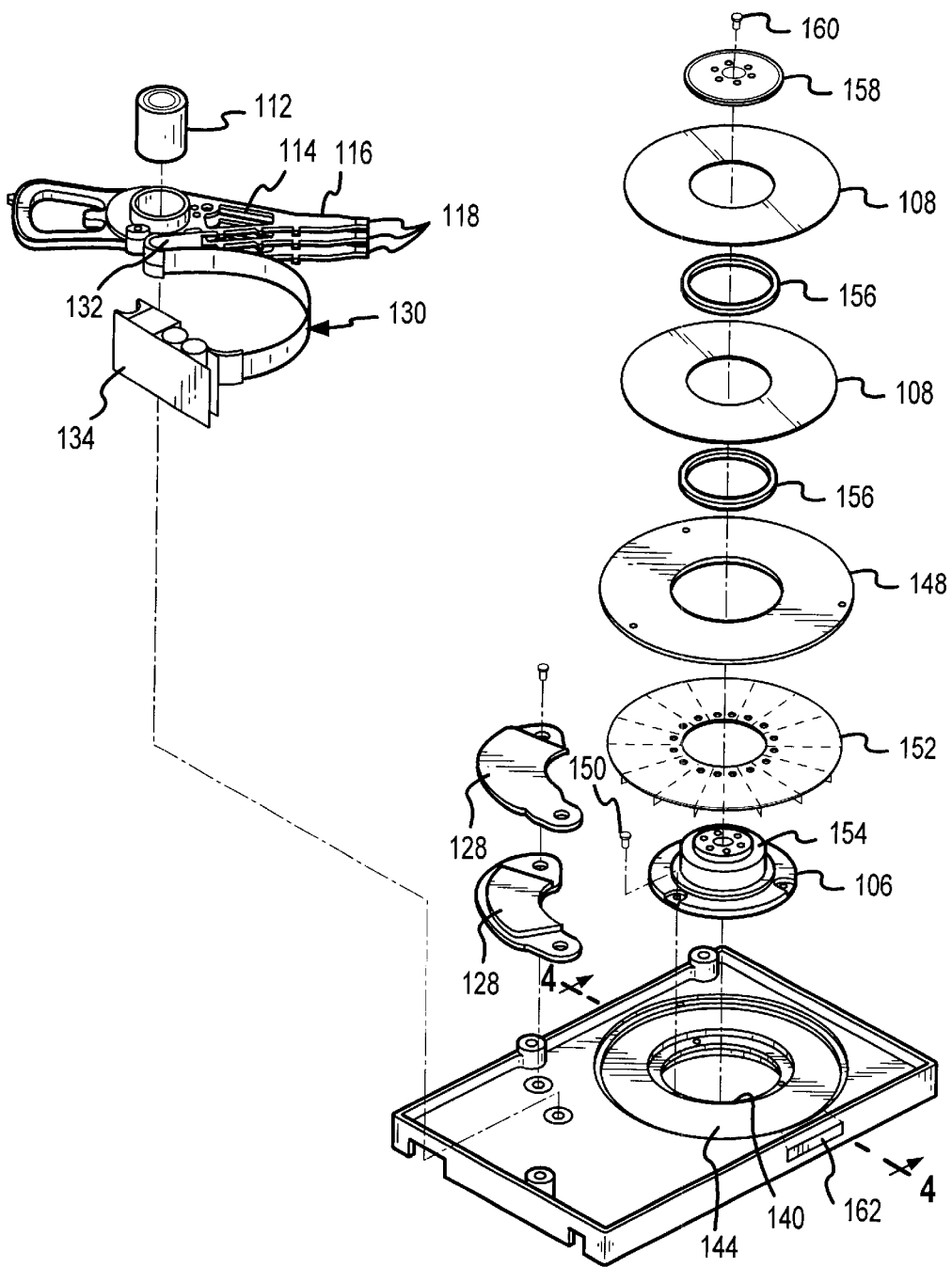
FIG. 1 is a an exploded view of a disc drive head disc assembly in accordance with a preferred embodiment of the present invention revealing the primary internal components of the head disc assembly of the disc drive.

FIG. 1 shows an exploded view of the major internal components of a disc drive head disc assembly (HDA) 100 in accordance with a preferred embodiment of the present invention The disc drive 100 includes a base or base plate 102 to which various components of the disc drive 100 are mounted. A top cover 104 (shown in FIG. 4) cooperates with the base plate 102 to form an internal, sealed environment for the disc drive head disc assembly 100 in a conventional manner when the components are assembled into the drive. This enclosed assembly is typically called a head disc assembly (HDA). The components in the disc drive, i.e. HDA 100 include a spindle motor 106 which rotates one or more data storage discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer or "head" 118 which includes an air bearing slider enabling the head 118 to fly in close proximity above the corresponding surface of the associated disc 108.

During a seek operation, the track position of the heads 118 is controlled through the use of a voice coil motor (VCM), which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones near the inner diameter of the discs 108 when the drive motor is de-energized. A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base plate 102 to a disc drive printed circuit board (not shown) mounted to the bottom side of the disc drive 100.

The base plate 102 is a generally rectangular frame plate that supports the internal components of the HDA. The base plate 102 has a flanged aperture 140 sized to accommodate the mounting flange 142 of the spin motor 106. Concentric with the aperture 140 is a circular recess 144 in the base plate 102 that has a peripheral ledge 146 extending around the recess 144. This peripheral ledge 146 supports the peripheral portion of a seal plate 148. The base plate 102 also has a channel 162 forming a passage leading from the circular recess 144 laterally through the base plate 102 and out through the exterior side wall of the base plate 102. A filter media (not shown) is preferably installed within the passage 162. This filter media prevents external environmental contaminants from entering the HDA when the drive 100 is shut down. The channel 162 preferably also has several vertical exhaust ribs or vanes (not shown in FIG. 1) that direct air flow through the channel 162 from the periphery of the disc 152. These exhaust ribs or vanes may also be straight or curved and preferably extend substantially through the passage 162.

The motor 106 is first installed in the aperture 140 and fastened to the base plate 102 via three screws 150. An impeller disc is then installed on the cylindrical spindle 154 of the motor 106. The seal plate 148 is then installed over the impeller disc 152 and fastened to the base plate 102 with three screws (not shown). A spacer ring 156 is then installed on the spindle 154, followed by a data storage disc 108, another spacer 156, another data storage disc 108 and finally, a retainer clamp ring 158. The retainer clamp ring 158 is fastened to the spindle 154 via screws 160. This completes the disc pack assembly process. The actuator assembly 110 is then assembled with the bearing cartridge 112 and then installed on the base plate 102 in a conventional manner along with the magnets 128 of the voice coil motor.

Figure 2:
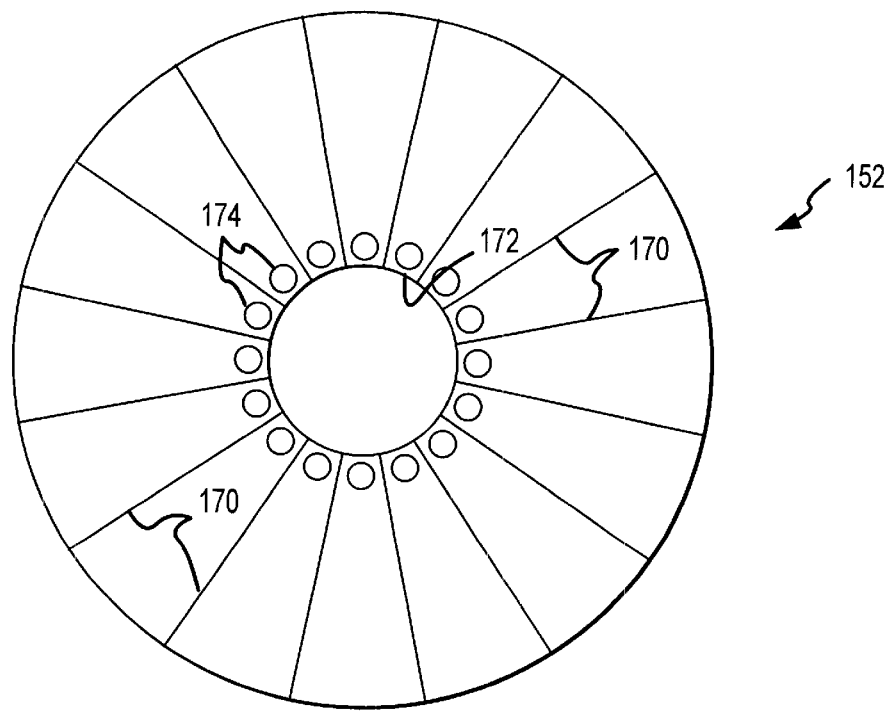
FIG. 2 is a plan view of the impeller disc in accordance with a preferred embodiment of the present invention.

A plan view of the underside of the impeller disc 152 is shown in FIG. 2. The impeller disc 152 is a flat annular disc having a central aperture 172, and is preferably made of aluminum. The disc 152 has a plurality of radial ribs or vanes 170 spaced equally around the disc 152. Each of the vanes 170 extends radially outward and projects outward in a direction normal to the plane of the underside surface of the disc 152. The ribs 170 may each be curved or straight as shown. Between each vane 170 adjacent the central aperture 172 is a suction hole 174. Thus the disc 152 having 16 vanes has 16 suction holes 174 through the disc 152 arranged around the central aperture 172.

Figure 3:
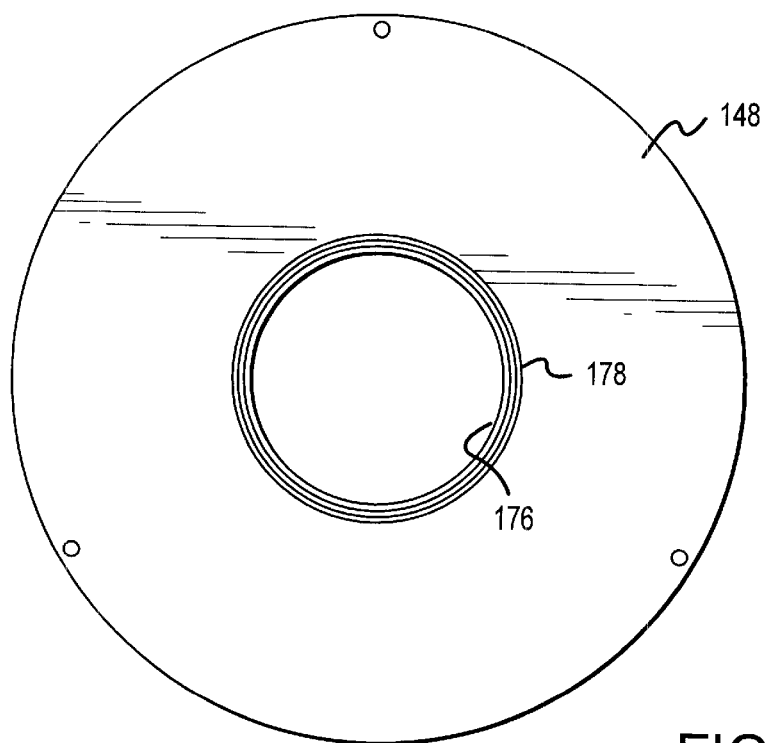
FIG. 3 is a plan view of a seal plate in accordance with a preferred embodiment of the present invention.

A plan view of the underside of the seal plate 148 is shown in FIG. 3. The seal plate 148 is a flat annular disc having a central aperture 176. It is preferably made of aluminum so as to be thermally compatible with the base plate 102. However, a polymer may also be utilized. The seal plate 148 has a set of alternating ridges and grooves formed around the aperture 176 forming a labyrinth seal 178.

The diameter of the aperture 176 is slightly greater than the distance between the outer edges of opposite holes 174 in the impeller disc 152. Thus, when the impeller disc is installed on the spindle 154 with the seal disc 148 installed on the base plate 102, the holes 174 are visible from above. When the entire disc pack is assembled, the holes 174 communicate with the internal HDA space above the seal plate 148. The labyrinth seal 178 minimizes "short cycling" of air drawn through the holes 174, outward along the vanes 170 and around the periphery of the impeller disc 152, and back to the holes 174, thus forcing the air drawn by the vanes 170 through the passage 162 and out of the disc drive 100 during drive operation.

Figure 4:
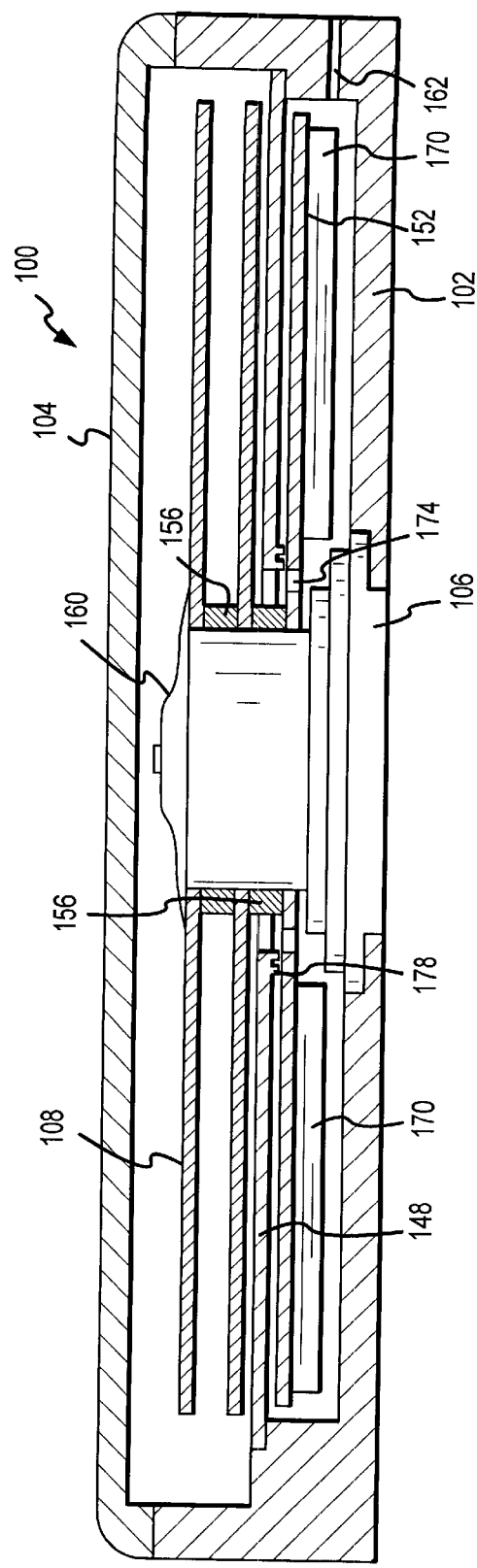
FIG. 4 is a cross sectional view through the disc drive motor taken along the line 4—4 in FIG. 1.

A cross sectional view of the HDA 100 through the disc pack assembled to the base plate 102 is shown in FIG. 4. Note that the first spacer ring 156 abuts against and spaces the lower data disc 108 vertically from the impeller disc 152. The upper spacer ring 156 separates the two data discs 108. This FIG. 4 clearly shows the air flow path from the space around the discs 108, through the holes 174 in the impeller disc 152, along the vanes 170 outward and then through the passage 162 to the outside environment. Back flow of air over the top surface of the impeller disc 152 is prevented by the labyrinth seal 178.

In summary, the present invention may be viewed as an air pump apparatus for drawing a vacuum within a disc drive data storage device (such as 100) that has a data storage disc (such as 108) rotatably mounted on a spin motor (such as 106) on a base plate (such as 102) within a head disc assembly. The pump apparatus includes an impeller disc (such as 152) fastened to a spindle (such as 154) of the spin motor (such as 106) within the head disc assembly (such as 100), a stationary seal plate (such as 148) over the impeller disc (such as 152) fastened to the base plate (such as 102). The base plate (such as 102) has a passage (such as 162) through it that communicates with an area adjacent a peripheral portion of the impeller disc (such as 152). The impeller operably draws air from within the head disc assembly (such as 100) to the area adjacent the peripheral portion of the impeller disc (such as 152) and through the passage (such as 162) and forces the air out of the head disc assembly to maintain a vacuum around the data storage disc (such as 108) during drive operation.

The seal plate (such as 148) has a central aperture (such as 176) and a labyrinth seal (such as 178) formed around the aperture. When the seal plate is installed, this labyrinth seal is positioned between the impeller disc (such as 152) and the seal plate (such as 148) and provides a barrier to air recirculating around the impeller disc (such as 152). The impeller disc (such as 152) has a central aperture (such as 172) for receiving the spindle (such as 154). The impeller disc (such as 152) has a series of holes (such as 174) spaced around and adjacent the central aperture (such as 172). A radially extending vane (such as 170) extends from between each adjacent hole (such as 174) outward and projects from a surface of the impeller disc (such as 152). The vanes (such as 170) each project from an underside surface of the impeller disc and are preferably straight. The impeller disc (such as 152) is mounted to the spindle (such as 154) between a spacer ring (such as 156) and a flange on the motor spindle (such as 154). The seal plate (such as 148) is fastened to the base plate (such as 102) beyond the periphery of the impeller disc (such as 152) and has a central aperture (such as 176) through which the motor spindle projects. The seal plate (such as 148) is spaced from the spindle (such as 154) because the aperture 176 is sized larger than the outer diameter of the spindle (such as 154).

Stated another way, the present invention may be viewed as a disc drive (such as 100) having a digital data storage disc (such as 108) rotatably supported on a spin motor (such as 106) mounted on a base plate (such as 102) within a head disc assembly enclosing the disc (such as 108), which has an impeller disc (such as 152) fastened to a spindle (such as 154) of the spin motor (such as 106) beneath the storage disc (such as 108) within the head disc assembly (such as 100). A stationary seal plate (such as 148) is positioned over the impeller disc (such as 152) and is fastened to the base plate (such as 102). The base plate (102) has a passage (such as 162) that communicates with an area adjacent a peripheral portion of the impeller disc (such as 152). The impeller operably draws air from within the head disc assembly (such as 100) to the area adjacent the peripheral portion of the impeller disc and through the passage (such as 162) out of the head disc assembly (such as 100) to maintain a vacuum around the data storage disc (such as 108) within the head disc assembly (such as 100) during drive operation.

The seal plate (such as 148) is mounted beneath the data storage disc (such as 108) and has a central aperture (such as 176). A labyrinth seal (such as 178) is formed around the aperture (such as 176) between the impeller disc (such as 152) and the seal plate (such as 148). The impeller disc (such as 152) has a central aperture (such as 172) for receiving the spindle (such as 154) therein. The impeller disc (such as 152) has a plurality of holes (such as 174) that are spaced around the central aperture (such as 172). A radially extending vane (such as 170) extends outward from between each adjacent hole (such as 174) and projects from a surface of the impeller disc (such as 152). The vanes (such as 170) preferably project from an underside surface of the impeller disc (such as 152). Each vane is preferably straight and the impeller disc (such as 152) is mounted to the spindle (such as 154) between a spacer ring (such as 156) and a flange on the motor spindle (such as 154).

The seal plate (such as 148) is fastened to the baseplate (such as 102) beyond the periphery of the impeller disc (such as 152) and has a central aperture (such as 176) through which the motor spindle (such as 154) projects. However, the seal plate (such as 148) is spaced from the spindle (such as 154) so that internal air beneath the disc (such as 108) may be sucked past the seal plate (such as 148) through the holes (such as 174) and past the vanes (such as 170) of the rotating impeller disc (such as 152) and through the passage (such as 162) out of the drive (such as 100). The passage (such as 162) is a channel in the base plate (such as 102) that extends from beneath a portion of the seal plate (such as 148) through the base plate (such as 102).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, the impeller disc 152 and the seal plate 148 may be entirely replaced by a micropump installed on the circuit board (not shown) attached to the exterior of the drive or alternatively mounted in an unused position inside the drive 100. Such a micropump would take suction from the internal space within the HDA and discharge through a passage such as passage 162 to the external environment. In this instance, the micropump would require electrical power to function such that the total power consumption savings would be less than that provided by the preferred embodiment shown. However, this reduction in savings may be offset by the space savings of not having to have an impeller disc and seal plate as shown. The impeller disc 152 may have any number of vanes 170 and holes 172. The vanes 170 may be curved or shaped to optimize the air flow to optimize the potential vacuum level that may be obtained during drive operation. The impeller disc may be comprised of a pair of discs fastened together and spaced apart by radial vanes providing radial channels for air to flow from suction openings to the outer periphery of the pair of discs thence through the passage 162. All such modifications, changes and alternatives are encompassed in the spirit of the invention disclosed and as defined in the appended claims.

What is claimed is:

1. In a disc drive data storage device enclosing a data storage disc rotatably mounted on a spin motor fastened to a base plate, an air pump apparatus for drawing a vacuum within the disc drive, the apparatus comprising:
   an impeller disc between the data storage disc and the base plate fastened to a rotating spindle of the spin motor within the disc drive;
   a stationary seal plate fastened to the base plate, the seal plate extending over the impeller disc; and
   the base plate having a passage therethrough leading out of the disc drive, the passage communicating with an area within the disc drive adjacent a peripheral portion of the impeller disc wherein the impeller operably draws air from within the disc drive to the area adjacent the peripheral portion of the impeller disc and through the passage out of the disc drive to maintain a vacuum around the data storage disc within the disc drive during drive operation.

2. The apparatus according to claim 1 further comprising the seal plate having a central aperture through which the spindle extends and a labyrinth seal formed around the aperture, the seal extending between the impeller disc and the seal plate.

3. The apparatus according to claim 1 wherein the impeller disc has a central aperture for receiving the spindle therein and the impeller disc has a plurality of holes therethrough spaced around and adjacent the central aperture, and a radially extending vane between each adjacent hole projecting from a surface of the impeller disc.

4. The apparatus according to claim 3 wherein the vanes project from an underside surface of the impeller disc.

5. The apparatus according to claim 3 wherein each vane is straight.

6. The apparatus according to claim 3 wherein the impeller disc is mounted to the spindle between a spacer ring and a flange on the motor spindle.

7. The apparatus according to claim 6 wherein the seal plate is fastened to the base plate beyond the periphery of the impeller disc and has a central aperture through which the motor spindle projects.

8. The apparatus according to claim 7 wherein the seal plate is spaced from the spindle.

9. A disc drive enclosing a digital data storage disc rotatably supported on a spin motor mounted on a base plate, the drive comprising:

an impeller disc fastened to a spindle of the spin motor beneath the storage disc within the disc drive; and a stationary seal plate over the impeller disc fastened to the base plate, the base plate having a passage therethrough leading out of the disc drive communicating with an area within the disc drive adjacent a peripheral portion of the impeller disc wherein the impeller operably draws air from within the disc drive to the area adjacent the peripheral portion of the impeller disc and through the passage out of the disc drive to maintain a vacuum around the data storage disc within the disc drive during drive operation.

10. The disc drive according to claim 9 wherein the seal plate is mounted beneath the data storage disc.

11. The disc drive according to claim 10 further comprising the seal plate having a central aperture through which the spin motor spindle extends and a labyrinth seal formed around the aperture extending between the impeller disc and the seal plate.

12. The disc drive according to claim 11 wherein the impeller disc has a central aperture for receiving the spindle therein and the impeller disc has a plurality of holes therethrough spaced around the central aperture, and a radially extending vane between each adjacent hole projecting from a surface of the impeller disc.

13. The disc drive according to claim 12 wherein the vanes project from an underside surface of the impeller disc.

14. The disc drive according to claim 12 wherein each vane is straight.

15. The disc drive according to claim 12 wherein the impeller disc is mounted to the spindle between a spacer ring and a flange on the motor spindle.

16. The disc drive according to claim 15 wherein the seal plate is fastened to the baseplate beyond the periphery of the impeller disc and has a central aperture through which the motor spindle projects.

17. The disc drive according to claim 16 wherein the seal plate is spaced from the spindle.

18. The disc drive according to claim 13 wherein the passage is a channel in the base plate extending from beneath a portion of the seal plate through the base plate.

* * * * *